Oct. 13, 1970  E. R. McCLURE  3,533,608
SMOG ARRESTER
Filed Aug. 2, 1968
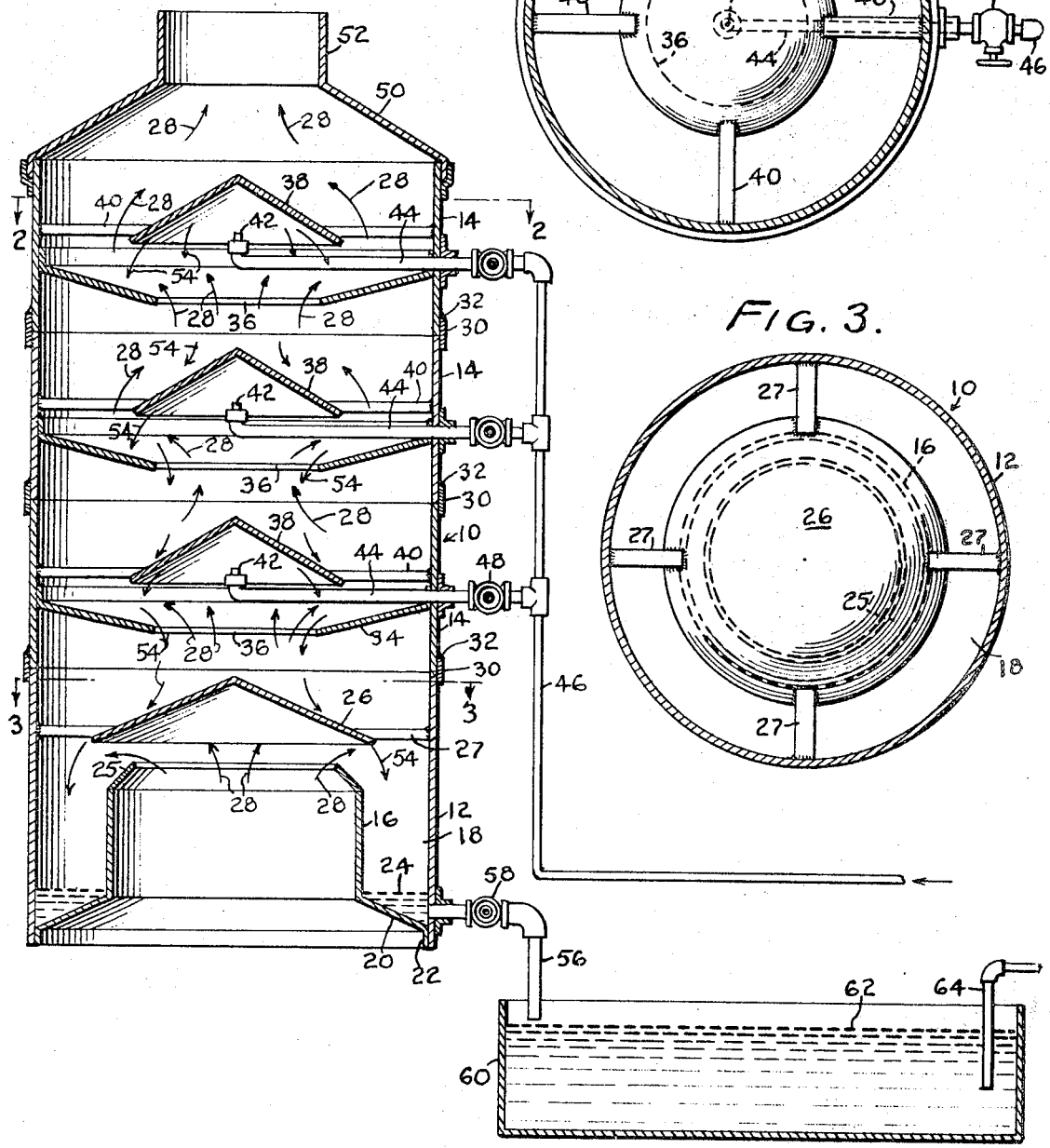
INVENTOR
*Elson R. McClure*
BY *Alexander B. Blair*
ATTORNEY

United States Patent Office 3,533,608
Patented Oct. 13, 1970

3,533,608
SMOG ARRESTER
Elson R. McClure, 1427 Carroll Lane,
Paradise, Calif. 95969
Filed Aug. 2, 1968, Ser. No. 749,857
Int. Cl. B01d 47/12
U.S. Cl. 261—109       1 Claim

ABSTRACT OF THE DISCLOSURE

A vertical tank-like structure made up of vertically superimposed sections, provided with usually alternate central and peripheral baffles, the latter of which have axial openings of smaller diameter than the outside diameter of the central baffles to cause products of combustion to flow alternately radially inwardly and outwardly as they move upwardly. The apparatus is adapted to be placed at the top of any structure from which products of combustion flow, such as an incinerator or stack, which might emit objectionable smoke, fumes, gases, etc. The heat of the products of combustion cause them to flow upwardly, and water sprays impinge against the bottoms of the central baffles. The weights of the water sprays cause the water to flow downwardly, thus picking up solid matter from the products of combustion, which solid matter is collected in the lower section to be piped to a settling tank, the water in the top of which may be reused.

SUMMARY OF THE INVENTION

The apparatus is in the nature of a vertical tank made up of a lower main section and a plurality of superimposed upper sections which may be made identical with each other. Any number of the superimposed upper sections may be used depending upon the degree of purification desired as well as the capacity needed for a given installation.

The lower main section is provided with an annular wall smaller in diameter than the outside wall of the section and sealed to the bottom thereof to form a collection tank. With the apparatus placed above a source of products of combustion, these products flow upwardly through the annular wall and impinge against a central conical baffle carried by the lower section. This baffle causes the products of combustion to flow radially outwardly and then upwardly around the peripheral edge of the baffle. The lowermost superimposed section is provided with a peripheral radially inwardly and downwardly sloping baffle having an axial opening therethrough for the upward flow of the products of combustion which flow is impeded by a conical baffle carried by the lowermost superimposed section. This conical baffle has an external diameter greater than the diameter of the axial opening in the downwardly and inwardly sloping baffle therebelow, thus again causing the products of combustion as they move upwardly to flow radially outwardly around the edges of the conical baffle. Beneath the latter baffle is arranged an upwardly projecting spray nozzle for spraying water against the bottom of the conical baffle. Some of this water flows directly downwardly from the baffle, while some of it by capillary attraction flows downwardly along the bottom wall of the conical baffle and then drops downwardly. This water collects solid particles from the products of combustion carrying such solid particles downwardly over the conical baffle of the main section, from whence it flows downwardly into the collecting tank or space.

The section superimposed on the lower main section is duplicated for the top of the apparatus, the number of superimposed sections depending upon the desired capacity according to the volume of flow of the products of combustion and the purity of the vapor discharged from the top of the apparatus. Each such superimposed section is provided with a lower downwardly and inwardly inclined baffle of annular form and a conical baffle thereabove, as described in connection with the lowermost superimposed section. The conical baffle of each superimposed section is provided with one of the spray nozzles referred to. Thus, if three superimposed sections are employed, there will be three spray nozzles, one for each such section, and accordingly, substantially all of the solid matter in the products of combustion will be intercepted by the downwardly moving water as the products of combustion flow upwardly. This counter flow of the products of combustion and water is highly efficient in removing solid particles from the products of combustion and also in occluding noxious gases from the products of combustion.

At the top of the apparatus is arranged a conical hood having a discharge stack centrally thereof for the flow from the apparatus of what little is left of the products of combustion, most of the vapor escaping from the top of the apparatus being in the form of steam which is quickly dissipated upon contact with the air.

BRIEF DESCRIPTION OF THE DRAWING

FIG. 1 is a vertical axial sectional view through the apparatus;

FIG. 2 is a section on line 2—2 of FIG. 1; and

FIG. 3 is a similar view on line 3—3 of FIG. 1.

DESCRIPTION OF THE PREFERRED EMBODIMENT

Referring to FIG. 1, the numeral 10 designates the smog arresting tank as a whole comprising a lower main section 12 and preferably a plurality of upper superimposed sections 14 which may be identical with each other. These various sections combine to make a vertical cylinder as will be apparent. The main section 12 is provided with an annular wall 16 spaced as at 18 from the outer wall of the main section and having a diverging conical skirt portion 20 flanged at its lower end as at 22 and preferably welded to the wall of the section 12. The space 18 forms a collection chamber, as indicated by the water 24 therein. The upper end of the wall 16 is provided with a conical diversion collar 25 for a purpose to be described.

Within the upper portion of the main section is arranged a conical baffle 26, spaced above the upper extremity of the wall 16 and of substantially greater diameter than the wall 16. The baffle 26 is supported relative to the section 12 by spider arms 27 welded at their respective ends to the baffle 26 and section 12. With the apparatus arranged over an incinerator stack or other source of products of combustion, such products flow upwardly and outwardly through the space between the wall 16 and baffle 26, the generally upwardly progress of the products of combustion being indicated by the upwardly extending arrows 28.

The superimposed section 14 immediately above the section 12 is provided with an annular band 30 projecting below the lower extremity of the lowermost section 14 and fitting around the main section 12. The band 30 is welded to the section 14 as at 32.

Spaced from the bottom thereof, the lowermost section 14 is provided with an annular baffle 34 having an axial opening 36 therethrough of substantially smaller diameter than the baffle 26. The baffle 34 slopes downwardly and inwardly so that water, supplied to the apparatus in a manner to be described, will always flow downwardly and inwardly and through the opening 36.

Above the baffle 34, the lowermost section 14 is provided with a conical baffle 38 fixed in position relative to the wall of the section 14 by spider arms 40 welded at opposite ends to the baffle 38 and to the wall 14. The baffle 38 is spaced above the baffle 34 and is of a diameter greater than the diameter of the opening 36. Thus, the products of combustion moving upwardly through the opening 36 are forced to turn radially outwardly around the baffle 38.

Axially beneath the baffle 38 is arranged a spray nozzle 42 through which water flows through a pipe 44 extending radially through the section 14 and connected to a supply pipe 46. The pipe 44 is provided with a control valve 48 to control the rate of flow of water to the nozzle 42. Obviously, the pipe 46 will be connected to a source of water under pressure.

In the embodiment of the invention illustrated, three of the sections 14 are employed in superimposed relation. These sections may be identical and the parts thereof have been indicated by the same reference numerals.

At the top of the apparatus is arranged a conical hood 50 having an axial discharge stack 52 at the top thereof. It will be apparent that the products of combustion, the flow of which is indicated by the arrows 28, will be generally upwardly except that the products of combustion within the apparatus are forced to partake of serpentine paths flowing upwardly through the openings 36 and around the baffles 38. Each successively higher section 14, of course, has its pipe 44 connected to an extension of the pipe 46. Accordingly, a nozzle 42 is provided beneath each baffle 38. Preferably, the strongest spray will be discharged from the lower nozzle 42, a less forceful spray from the intermediate nozzle 42, and a still finer spray from the uppermost nozzle 42.

Water flowing from each nozzle 42 will impinge against its associated baffle 38. Some of this water will be diverted radially outwardly to drop directly through the next lower opening 36. Some of the water will flow by capillary attraction downwardly along the bottom face of each baffle 38 to drop downwardly, the flow of the water being indicated by the downwardly pointing arrows 54. The water thus sprayed and dropping downwardly by gravity will intercept solid particles in the products of combustion until all such particles have been removed. The water will also absorb most, if not all, of the noxious gases in the products of combustion, and the water flowing downwardly over the baffle 26 will be collected in the space 18 as at 24. The diversion collar 25 deflects radially outwardly any water coming into contact therewith, which might have a tendency to extinguish the fire.

The collar 25 may be welded to the upper end of the wall 16. The space 24 is connected by a pipe 56, controlled by a valve 58, to a large collecting tank 60 located at any suitable point and in which the polluted water 62 may collect to settle. The valve 58 may be closed from time to time to allow water in the tank to settle and to be pumped therefrom through a pipe 64 to be reused. The valve 58 then will again be opened to discharge polluted water from the space 18. From time to time, of course, it will be necessary to clean the tank 60, and the solids recovered from the water may be used for any purpose, for example, in agriculture, the chemical arts, industry, etc.

From the foregoing it will now be seen that there is herein provided an improved smog arrester which accomplishes all of the objects of this invention and others, including many advantages of great practical utility and commercial importance.

As various embodiments may be made of ths inventive concept, and as many modifications may be made in the embodiment hereinbefore shown and described, it is to be understood that all matter herein is to be interpreted merely as illustrative, and not in a limiting sense.

What is claimed is:

1. A smog arrester comprising a vertically elongated tank having an annular wall in the bottom thereof sealed to the tank to define therewith a collecting space, said tank being adapted to be arranged over a structure discharging products of combustion, which products flow upwardly through said annular wall, a series of alternate central baffles having the shape of complete cones and centrally spaced from the wall of said tank and annular downwardly and inwardly sloping baffles having axial openings therethrough, the axial openings through said downwardly and inwardly sloping baffles being of smaller diameter than the external diameter of said conical baffles, and a single nozzle vertically aligned with the top point of each conical baffle for spraying water upwardly against and blanketing the complete bottom surface of each of said conical baffles which cause the water to be totally and directly deflected downward creating sufficient downward force to keep the solid particles suspended in space as the gas vapor rises around and over each of said conical baffles for facilitating the capture of the particles by cascading water without retarding combustion or extinguishing the flame in the combustion chamber.

References Cited

UNITED STATES PATENTS

| 2,354,674 | 8/1944 | Fisher | 261—111 X |
| 2,414,718 | 1/1947 | Christensen | 261—111 |
| 1,620,826 | 3/1927 | Mitchell | 261—111 X |
| 3,140,163 | 7/1964 | Hausberg | 261—111 X |

FOREIGN PATENTS 1,099,737  9/1955  France.

TIM R. MILES, Primary Examiner

S. H. MARKOWITZ, Assistant Examiner

U.S. Cl. X.R.

261—112, 117, 118